(12) United States Patent
Muras

(10) Patent No.: US 8,566,333 B2
(45) Date of Patent: Oct. 22, 2013

(54) MULTIPLE SPARSE INDEX INTELLIGENT TABLE ORGANIZATION

(75) Inventor: Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 13/005,024

(22) Filed: Jan. 12, 2011

(65) Prior Publication Data

US 2012/0179698 A1  Jul. 12, 2012

(51) Int. Cl.
*G06F 7/00* (2006.01)

(52) U.S. Cl.
USPC .......................................... 707/752

(58) Field of Classification Search
USPC .......................................... 707/752
See application file for complete search history.

(56) References Cited

U.S. PATENT DOCUMENTS

| | | | |
|---|---|---|---|
| 5,758,145 A * | 5/1998 | Bhargava et al. | 707/744 |
| 5,884,307 A * | 3/1999 | Depledge et al. | 1/1 |
| 6,122,626 A * | 9/2000 | Brandsma | 1/1 |
| 6,546,395 B1 | 4/2003 | DeKimpe et al. | |
| 6,629,102 B1 | 9/2003 | Malloy et al. | |
| 6,879,976 B1 * | 4/2005 | Brookler et al. | 1/1 |
| 7,191,174 B2 | 3/2007 | Day et al. | |
| 2004/0236727 A1 | 11/2004 | Day et al. | |
| 2006/0064416 A1 | 3/2006 | Sin-Tang | |
| 2010/0036799 A1 | 2/2010 | Bouloy et al. | |

FOREIGN PATENT DOCUMENTS

| | | |
|---|---|---|
| CN | 1877576 A | 12/2006 |
| CN | 101520868 A | 9/2009 |
| CN | 101702162 A | 5/2010 |

OTHER PUBLICATIONS

Eun-Jin Im et al., "Optimization of Sparse Matrix Kernels for Data Mining," University of California, Berkely Research Paper, Abstract No. 193, 2000.

* cited by examiner

*Primary Examiner* — Jensen Hu
(74) *Attorney, Agent, or Firm* — Kevin D. Kehe; James R. Nock

(57) ABSTRACT

A method, system and computer program product are provided for reorganizing a database table according to multiple sparse indexes, wherein the reorganized table has superior I/O performance attributes versus the original table. More specifically, the table is reorganized such that random I/O is minimized by more tightly grouping rows in the table associated with each of the referencing sparse indexes together. This enables more associated rows from a given table relevant to a sparse index to be read into RAM for a given I/O operation.

30 Claims, 5 Drawing Sheets

400

405 410 415

| Column_X | DCBA => Sort Weight |
|---|---|
| 1 | 0100 => 4 |
| 2 | 0010 => 2 |
| 3 | 0100 => 4 |
| 4 | 1010 => 10 |
| 5 | 0001 => 1 |
| 6 | 0010 => 2 |
| 7 | 1000 => 8 |
| 8 | 0001 => 1 |
| 9 | 1000 => 8 |
| 10 | 0101 => 5 |

420

| Column_X | Column_Y |
|---|---|
| 5 | Other data... |
| 8 | |
| 2 | |
| 6 | |
| 1 | |
| 3 | |
| 10 | |
| 7 | |
| 9 | |
| 4 | |

FIG. 4

MULTIPLE SPARSE INDEX INTELLIGENT TABLE ORGANIZATION

BACKGROUND

1. Technical Field

The field of invention relates to databases. In particular, the field of invention relates to reorganizing a table according to multiple sparse indexes.

2. Description of the Related Art

Databases use tables to organize information. Each table consists of a number of rows, each of which corresponds to a single database record. Keys are used to organize the database. Each database table has one or more columns designated as the primary key. The value of this key is unique for each record in the database. For example, assume a table exists that contains personnel information on every employee in an organization. An example of a primary key in this scenario would be an employee serial number unique to each employee.

A database index is a data structure that improves the speed of operations in a table. Indexes can be created using one or more columns, providing the basis for both rapid random lookups and efficient ordering of access to records. The disk space required to store the index is typically less than the storage of the table (since indexes usually contain only the key-fields according to which the table is to be arranged, and excludes all the other details of the table). Thus, indexes can be stored in memory in instances where the entire table might not fit.

Database tables are traditionally organized physically on a storage medium (such as a hard disk) according to some index (e.g., a primary key such as employee serial number). In most instances, rows within the database table are processed on a key ordered basis. Thus, physically storing database tables on the disk in keyword order minimizes I/O time, since multiple rows can be brought into memory with each I/O operation.

Structured Query Language (SQL) sparse indexes are a newer technology that is gaining popularity. A sparse index is an index with a key and pointers to rows in a database table for a subset of data in the table. Every key in the index is associated via pointers with a row in the database table. However, not every row in the table may be pointed to by a key in the index. Application designers have begun to create multiple sparse SQL indexes to tune particular application queries. For many highly tuned applications, hundreds or even thousands of sparse indexes may be created to match many of the application queries.

Currently, there is no way to physically reorganize a table according to multiple sparse indexes. Thus, as multiple sparse index use becomes more common in some environments, performance may be suboptimal due to high randomness of the I/O operations. For example, if a particular index selects n rows, the n rows may be spread over up to n blocks of data on disk causing up to n IOs when they are read into memory.

SUMMARY OF THE DISCLOSURE

The disclosure and claims herein are directed to a method, system and computer program product for reorganizing a table according to multiple sparse indexes. With the reorganized table, the I/O performance attributes of database queries will be improved, since the reorganized table tends to group rows corresponding to each of the sparse indexes more closely together.

In one embodiment, a method for reorganizing a database table residing on a computer system according to a plurality of sparse indexes is provided. The method begins by constructing a bitmap for each row entry (i.e., a specific row in a table) within the database table, the bitmap having n bit positions. Each of the n bit positions corresponds to the referencing state of one of the plurality of sparse indexes. The method then sorts the row entries within the database table based upon the value of the bitmap.

In one embodiment, the step of constructing a bitmap further comprises the steps of: 1) initializing the bitmap to "0"; 2) for each row within the database table, determining if any of the plurality of sparse indexes point to the row; and 3) if any of the plurality of sparse indexes point to the row, setting the bit positions within the bitmap corresponding to the reference sparse indexes associated with the row to "1"). In one embodiment, the bit positions within the bitmap are organized such that the most significant bit positions within the bitmap are assigned to the most popular indexes within the plurality of sparse indexes, and the least significant bit positions within the bitmap are assigned to the least popular indexes. In one embodiment, the popularity of each of the sparse indexes is determined by monitoring query use of the sparse index by at least one counter. In another embodiment, the popularity of each of the sparse indexes is determined by computing and saving the average job priority of queries associated with the sparse index, wherein the highest average job priority sparse indexes are the most popular indexes, and the lowest average job priority indexes are the least popular indexes. In one embodiment, the bit positions within the bitmap are organized such that the most significant bit positions within the bitmap are assigned to the indexes which select the most rows within the plurality of sparse indexes, and the least significant bit positions within the bitmap are assigned to the indexes which select the fewest rows.

In one embodiment, the plurality of sparse indexes reference the same column within the database table, while in an alternative embodiment the plurality of sparse indexes references a plurality of columns within the database table. In one embodiment, one or more of plurality of sparse indexes are ignored in computing the value of the bitmap, based upon a set of predefined criteria. As an example, one of the set of predefined criteria is the number of rows selected by the sparse index.

In one embodiment, the present invention also provides a program product having a recordable computer readable storage medium. Program code is stored on the computer readable storage medium and is configured upon execution to reorganize a database table residing on a computer system according to a plurality of sparse indexes, including the steps of: constructing a bitmap for each row entry within the database table, the bitmap having n bit positions, each of the n bit positions corresponding to the referencing state of one of the plurality of sparse indexes; and sorting the row entries within the database table based upon the value of the bitmap.

In one embodiment, the present invention also provides a system, the system including one of more computer processors, and a memory containing a program, which when executed to the one or more processors is configured to perform an operation. The operation includes: constructing a bitmap for each row entry within the database table, the bitmap having n bit positions, each of the n bit positions corresponding to a referencing state of one of the plurality of sparse indexes; and sorting the row entries within the database table based upon the value of the bitmap.

The foregoing and other features and advantages will be apparent from the following more particular description, as illustrated in the accompanying drawings.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 illustrates a first table, wherein a bitmap is created for each row based upon which of the sparse indexes reference the given row; and a second table created upon sorting the rows of the first table based on the numerical value of the bitmap associated with each row.

DETAILED DESCRIPTION OF THE PREFERRED EMBODIMENTS

A method, system and computer program product are provided for reorganizing a database table according to multiple sparse indexes, wherein the reorganized table has superior I/O performance attributes versus the original table. More specifically, the table is reorganized such that random I/O is minimized by more tightly grouping rows in the table associated with each of the referencing sparse indexes together. This enables more associated rows from a table relevant to a specific sparse index to be read into memory for a given I/O operation.

Figure 1:
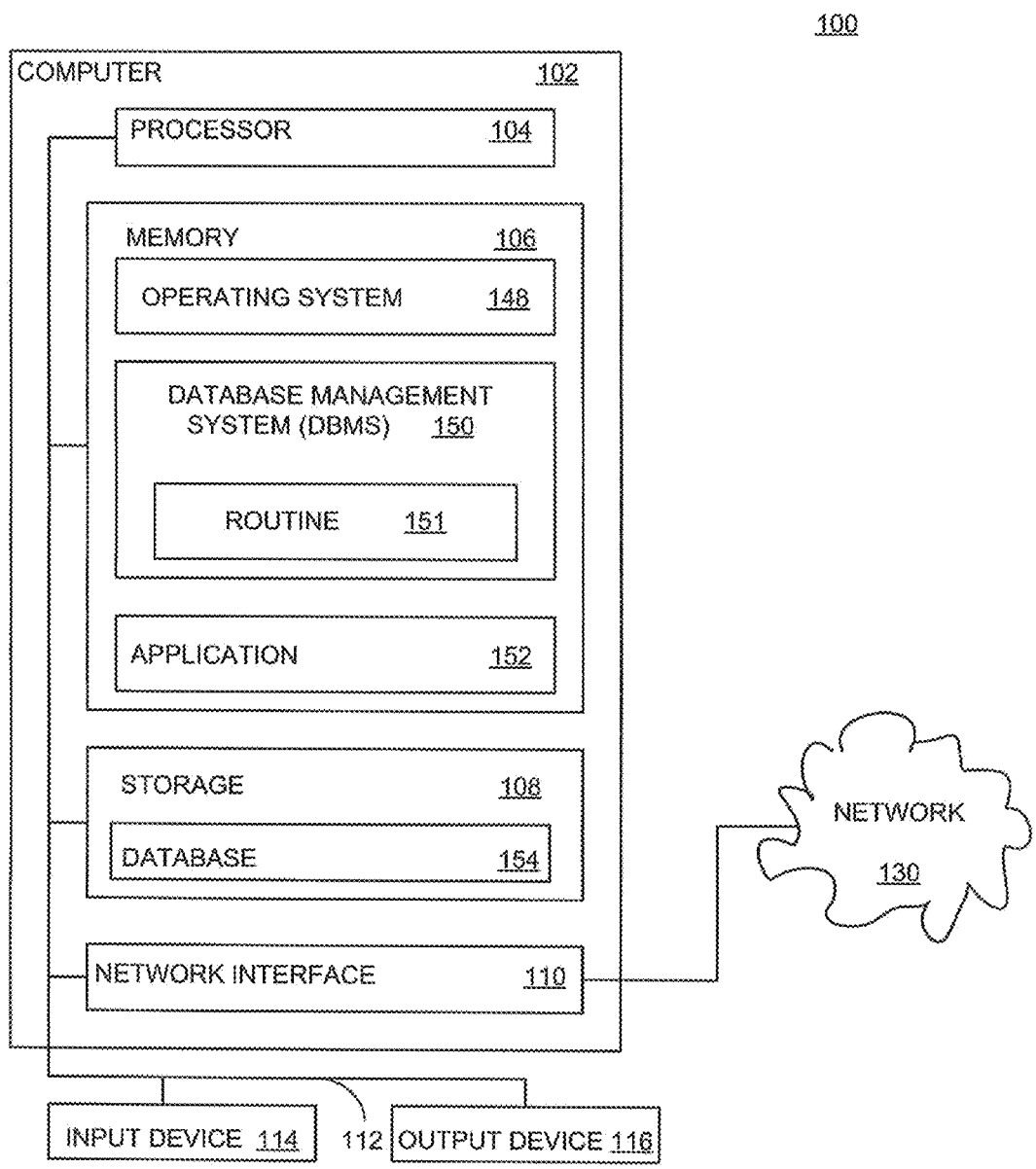
FIG. 1 is a block diagram illustrating a system for reorganizing a database table according to multiple sparse indexes, according to one embodiment of the present invention.

FIG. 1 is a block diagram illustrating a networked system 100 for reorganizing a database table according to multiple sparse indexes, according to one embodiment of the present invention. The networked system 100 includes a computer 102. The computer 102 may also be connected to other computers via the network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 148. Examples of operating systems include UNIX, versions of the Microsoft Windows® operating system, IBM i (formerly known as i5/OS®) integrated operating environment running on IBM Power Systems™, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger memory capacity DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes the operating system 148, a Database Management System (DBMS) 150, and an application 152. The DBMS 150 may manage a database 154, shown in storage 108. In one embodiment, the DBMS 150 is the DB2 product offered by the IBM Corporation for the MVS, AIX, IBM I, Linux or Microsoft Windows operating systems, as examples. Generally, those skilled in the art will recognize that the present invention has application to any DBMS software that uses SQL, and may similarly be applied to database software using non-SQL queries. More generally, however, it should be understood that the data to be accessed need not be part of a DBMS at all. The application 152 (and more generally, any requesting entity, including the operating system 148) is configured to issue queries against the database 154. Although only one database is shown for simplicity, the DBMS 150 may manage multiple databases. Further, the databases may be distributed relative to one another, e.g., over the network 130. And although the application 152 and the DBMS 150 are shown to be executing on the computer 102, the application 152 may also execute on a different computer that communicates with the computer 102 via the network 130.

In one embodiment, the database 154 is representative of any collection of data, regardless of the particular physical representation of the data. A physical representation of data defines an organizational schema of the data. By way of illustration, the database 154 may be organized according to a relational schema (accessible by SQL queries) or according to an XML schema (accessible by XML queries). However, embodiments of the invention are not limited to a particular schema and contemplate extension to schemas presently unknown. As used herein, the term "schema" generically refers to a particular arrangement of data.

In one embodiment, the database 154 stores database tables that include data pages. Each data page is configured to store data rows that, in turn, store information. The database may also include a database index such as a sparse index for logically ordering the data rows. The database index includes index pages. Each index page is configured to store index entries, where each data row is referenced by a corresponding index entry. The data pages and the index pages are arranged to be stored on and retrieved from a storage medium such as the storage 108.

In one embodiment, the application 152 issues a request to the DBMS 150. The request includes a query statement (e.g., a select, insert, or update). Depending on the embodiment, the request issued by the application 152 may be predefined (i.e., hard coded as part of the application 152) or may be generated in response to input (e.g., user input).

In one embodiment, to service the request from the application 152, the DBMS 150 performs a number of database operations. For example, the DBMS 150 retrieves index entries and data rows from storage (e.g., disk or tape) into a database cache (e.g., in main memory). The speed of accessing the storage 108 may be much slower than other operations involved in servicing a request, such as operations involving the database cache. Consequently, performance of the DBMS 150 in servicing the request may be, to a large extent, determined by a frequency with which the DBMS 150 accesses the storage 108.

In one embodiment, the DBMS 150 includes one or more routines 151 to reorganize one or more tables within the database such that random I/O is minimized by more tightly grouping rows in the table associated with each of the referencing sparse indexes together. This enables more associated rows from a table relevant to a specific sparse index to be read into memory for a given I/O operation. Accordingly, the performance of the DBMS 150 in servicing requests may be improved.

In one embodiment, the reorganization (i.e. sort) of the tables within the database is manually initiated by a system administrator. Typically, such an activity would be scheduled to occur at a time when overall system activity is slow such as over a weekend. In another embodiment, the reorganization may be performed periodically (weekly, monthly, etc) or as needed, as determined by a degree of adjacency metric. For example, a DBMS may have an application which measures the degree of adjacency for rows referenced by each sparse matrix. If, for example, the measurement application is run periodically and shows the rows are not very adjacent (i.e., fragmented) for each sparse index (i.e., the degree of adjacency metric exceeds a predefined threshold value), the measurement application may recommend to the system administrator to perform a reorganization, or alternatively, automatically reorganize the table via a reorganization application.

Figure 2:
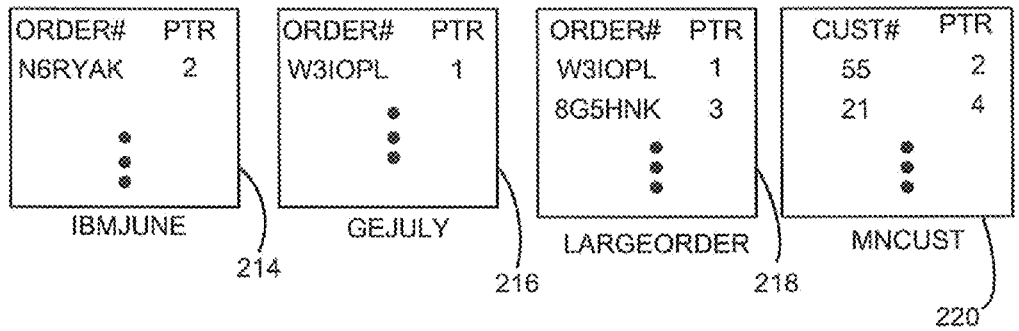
FIG. 2 (Prior Art) illustrates a set of example query statements for creating sparse indexes from a database table.

FIG. 2A (Prior Art) illustrates a set of example query statements for creating sparse indexes from a database table, shown generally at 200. In the illustrated embodiment, four SQL CREATE INDEX statements 202, 204, 206 and 208 are used to create a set of four sparse indexes 214, 216, 218 and 220 using SQL selection predicates on a table 210.

In the first example SQL CREATE INDEX statement 202, a sparse index entitled "IBMJUNE" 214 is created from table "MYTABLE" 210 over column "ORDER#" 211 where field "CUST" in the table contains the value "IBM", and the field "MONTH" in the table contains the value "June". As can be seen, row 2 of table "MYTABLE" 210 satisfies the search criteria, and the ROW value "2" and the "ORDER#" value "N6RYAK" are written to the "IBMJUNE" sparse index 214. The "ROW" value 2 in the second column of the sparse index 214 serves as a pointer back into the table 210.

In the second example SQL CREATE INDEX statement 204, a sparse index entitled "GEJULY" 216 is created from table "MYTABLE" 210 over column "ORDER#" 211, where field "CUST" in the table contains the value "GE", and the field "MONTH" in the table contains the value "July". In this instance, row 1 of the table "MYTABLE" 210 satisfies the search criteria, and the "ROW" value "1" and the "ORDER#" value "W3IOPL" are written to the "GEJULY" sparse index 216. The "ROW" value 1 in the second column of the sparse index 216 serves as a pointer back into the table 210.

In the third example SQL CREATE INDEX statement 206, a sparse index entitled "LARGEORDER" 218 is created from table "MYTABLE" 210 over column "ORDER#" 211, wherein any entry in table "MYTABLE" 210 where field "AMOUNTDUE" exceeds $1,000,000 will be selected for inclusion in sparse index "LARGEORDER" 218. In this instance, rows 1 and 3 of the table "MYTABLE" 210 satisfy the search criterion, and the ROW values "1" and "3" and the "ORDER#" values "W3IOPL" and "8G5HNK", respectively, are written to the "LARGEORDER" sparse index 218. The "ROW" values 1 and 3 in the second column of the sparse index 218 serve as pointers back into the table 210.

In the fourth example SQL CREATE INDEX statement 208, a sparse index entitled "MNCUST" 220 is created from table "MYTABLE" 210 over column "CUST#" 212, wherein any entry in "MYTABLE" 210 that contains the value "MN" in the "STATE" field will be selected for inclusion in the spare index "MNCUST" 220. In this instance, rows 2 and 4 of the table "MYTABLE" 212 satisfy the search criterion, and the ROW values "2" and "4" and the "CUST#" values "11" and "55", respectively, are written to the "MNCUST" sparse index 220. The "ROW" values 2 and 4 in the second column of the sparse index 220 serve as pointers back into the table 210.

Another type of sparse index in addition to SQL is a Select/Omit logical file. A Select/Omit logical has keys and criteria which specifies which rows (or records) to either select or omit from the full physical file (i.e. table). The specific Select/Omit definition is specified via Data Description Specification (DDS). This select/omit portion is similar in functionality to the WHERE clause in an SQL sparse index.

Select/Omit logicals are normally used with traditional database interfaces in RPG, COBOL, or CL. Whereas, modern languages tend to use SQL based interfaces to the database. Both interfaces allow similar functionality, but require different methods and syntax to specify the key(s) and selection criteria of the index.

Additional types of sparse indexes may be utilized within the present invention, in addition to the SQL and select/omit logical files, and still remain within the scope and spirit of the present invention.

Figure 3:
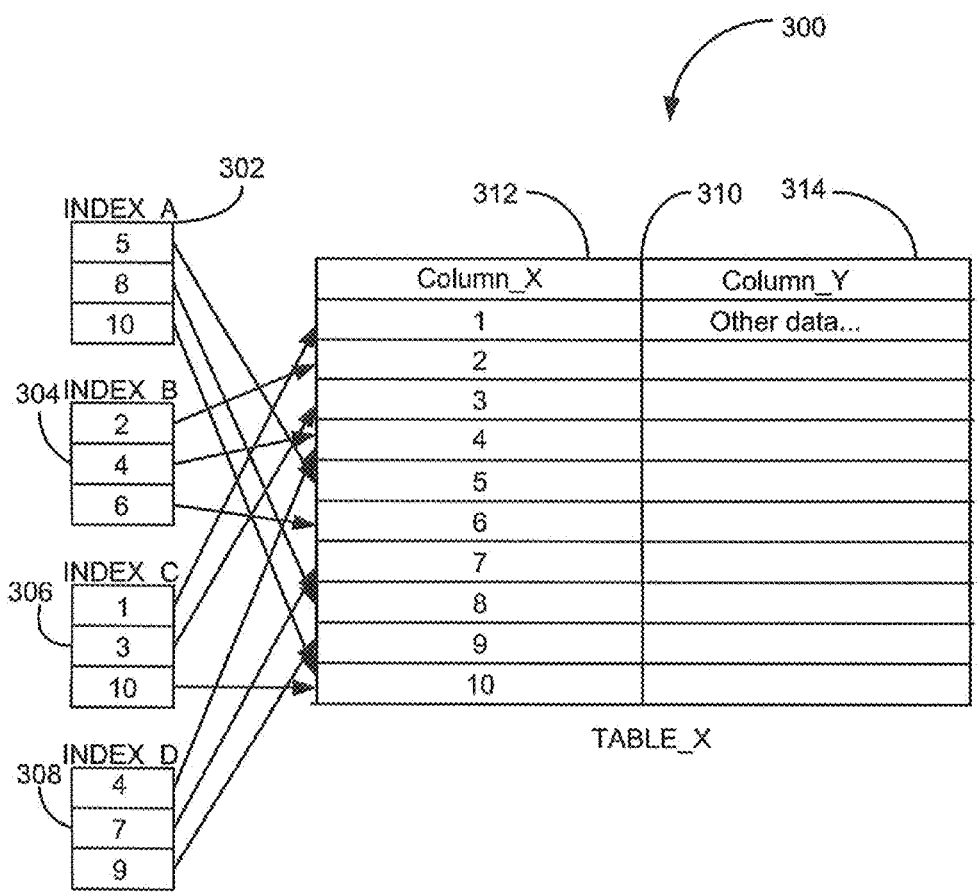
FIG. 3 (Prior Art) illustrates a plurality of sparse indexes pointing to a referenced table, where no sparse index has rows in the referenced table that are adjacent to each other.

FIG. 3 (Prior Art) illustrates a plurality of sparse indexes 302, 304, 306 and 308 pointing to a referenced table 310, where no sparse index points to rows in the referenced table that are adjacent to each other, shown generally at 300. In the illustrated example, the rows within COLUMN_X 312 of the table are in order. Despite this fact, no sparse index 302, 304, 306 or 308 has rows which are adjacent to each other. For example, sparse INDEX_A 302 references rows 5, 8 and 10 within table 310. Sparse INDEX_B 304 references rows 2, 4 and 6 within table 310. Sparse INDEX_C 306 references rows 1, 3 and 10 within the table 310. Finally, sparse INDEX_D 308 references rows 4, 7 and 9 within the table 310.

As a result, when applications build SQL sparse indexes (such as 302, 304, 306 and 308) to match certain queries, the non-adjacency of the referenced rows within table 310 will tend to cause I/O operations to be random rather than blocked, thus producing suboptimal performance.

FIG. 4 illustrates a first table 410, in accordance with the present invention, wherein a bitmap 415 is created for each row entry within the table based upon which of the sparse indexes reference the given row; and a second table 420 created upon sorting the rows of the first table in ascending order based on the numerical value of the bitmap associated with each row, shown generally at 400. First table 410 is essentially table 310 from FIG. 3, with the addition of a new column 415 containing bitmap information associated with each row of the table.

As illustrated earlier in FIG. 3, each row within the table may be associated with at least one sparse index within the table 310. In FIG. 4, in column 415, a bitmap entry is created for each row, wherein the i-bit position within the bitmap entry represents the i-th sparse index. Thus if a given row is referenced by a sparse index, a "1" appears in the bit associated with that sparse index in the bitmap entry, otherwise the bit entry contains a "0" (default) value assigned at initialization.

After the entire bitmap entry is constructed, a decimal representation is then computed for each bitmap entry. This decimal representation becomes the sort weight for each row within the table. Thus, a bitmap value of "0100" would be assigned a decimal value of "4", and a bitmap value of "1010" would be assigned a decimal value of "10". This value is used to re-sort the rows of the table. Second table 420 illustrates first table 410, after the table has been re-sorted. Note that the table has been re-sorted in ascending order, based on the decimal value of the bitmap in the first table 410, column 415.

By way of example, the first row of the first table 410 is pointed to by sparse Index "C" 306 (see FIG. 3). As a result, the bitmap 315 associated with the first row is "0100" (the columns in the bitmap being arranged in DCBA order), having a decimal sort weight value of "4". Row 4 of table 410 is pointed to by two sparse indexes (Index_B 304 and Index_D 308 as shown in FIG. 3). As a result, the "B" and "D" values within the bitmap are assigned a "1" value associated with the reference sparse index. Since the bitmap is arranged in DCBA order, the resultant bitmap value associated with the row is "1010", or decimal value "10".

Note that if a row is not selected by any index, it would have a sort weight of zero and be blocked with other rows that are not selected by any index. Within a particular sort weight, rows can, by way of example, be sorted by the actual value in the column.

Within the examples provided, all sparse indexes point to the same column within the database table. In other embodiments of the present invention, the sparse indexes may point to a different column, or plurality of columns within the database table, and still remain within the scope and spirit of the present invention.

In one embodiment, when determining sort order for the database table, the leftmost position in the bitmap is associated with the most popular index, the second leftmost position in the bitmap is associated with the second most popular index, etc. In this way, the most popular indexes will be grouped more tightly together, and, in fact, the leftmost bit position is guaranteed to have all of its rows together.

There are several alternatives available to determine the most popular sparse indexes. For example, the most popular index can be determined by monitoring which sparse indexes different database queries use, then keeping counters for each sparse index to determine the popularity. In another example, the priority of jobs in which database queries run is monitored and recorded, such that sparse indexes used most often in high priority jobs are associated with the leftmost bitmap positions, while sparse indexes most used with lower priority jobs are associated with the rightmost bitmap positions. In this way, the highest average job priority sparse indexes are the most popular indexes, and the lowest average job priority sparse indexes are the least popular indexes. In one embodiment, the bit positions within the bitmap are organized such that the most significant bit positions within the bitmap are assigned to the indexes which select the most rows within the plurality of sparse indexes, and the least significant bit positions within the bitmap are assigned to the indexes which select the fewest rows.

In one embodiment of the present invention, certain sparse indexes may not be considered (i.e., ignored) when determining the sort weight. As an example, if a certain sparse index selects too may rows within a table, it may be ignored, since it implicitly causes rows to be blocked. Similarly, if a certain sparse index selects too few rows, it may also be ignored since it would not need to use blocking. Additionally, a sparse index may not be frequently be used enough to be considered.

Figure 5:
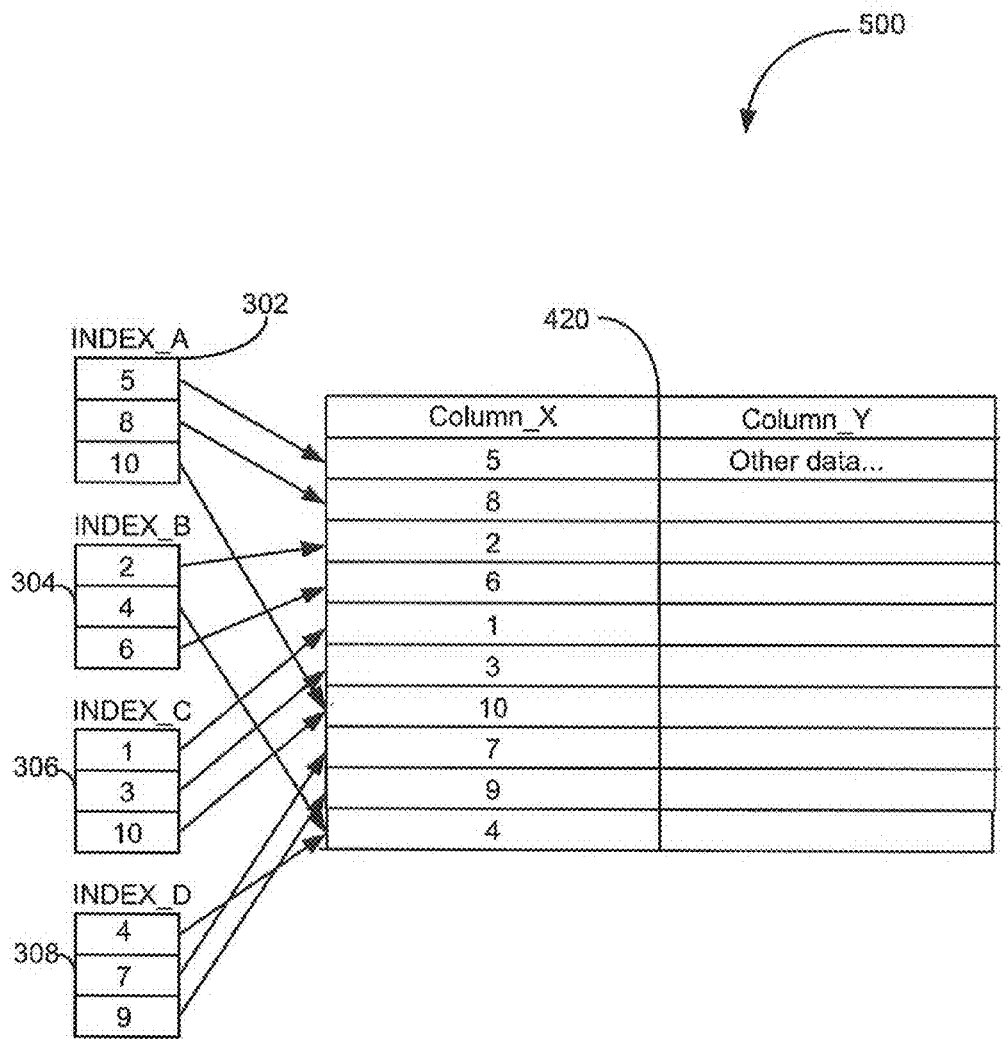
FIG. 5 illustrates the plurality of sparse indexes of FIG. 3, pointing to the updated second table of FIG. 4, wherein most of the rows in the table are now adjacent to other rows in each of the sparse indexes.

FIG. 5 illustrates the plurality of sparse indexes of FIG. 3, pointing to the updated, sorted second table 420 of FIG. 4, wherein most of the rows in the table are now adjacent to other rows in each of the sparse indexes. In this illustrative example, the first two sparse indexes 302 and 304 now have ⅔ of their rows adjacent in the sorted table 420, and the last two sparse indexes 306 and 308 have all of their rows adjacent to each other. Thus, random I/O is minimized and blocking of rows into memory is enhanced, resulting in faster overall access performance when using the sparse indexes.

In the preceding paragraphs, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for reorganizing a database table residing on a computer system according to a plurality of sparse indexes, comprising:
   constructing a bitmap for each row entry within the database table, the bitmap having n bit positions, each of the n bit positions corresponding to a referencing state of one of the plurality of sparse indexes;
   computing a value for the bitmap as a function of individual bit values for the n bit positions; and
   sorting the row entries within the database table based upon the value of the bitmap.

2. The computer-implemented method of claim 1, wherein constructing a bitmap further comprises:
   initializing the bitmap to "0";
   for each row within the database table, determining if any of the plurality of sparse indexes point to the row; and
   if yes, setting the bit positions within the bitmap corresponding to the referencing sparse indexes associated with the row to "1".

3. The computer-implemented method of claim 2, wherein the bit positions within the bitmap are organized such that the most significant bit positions within the bitmap are assigned to the most popular indexes within the plurality of sparse indexes, and the least significant bit positions within the bitmap are assigned to the least popular indexes.

4. The computer-implemented method of claim 3, wherein the popularity of each of the sparse index is determined by monitoring query use of the sparse index by at least one counter.

5. The computer-implemented method of claim 3, wherein the popularity of each of the sparse indexes is determined by computing and saving the average job priority of queries associated with the sparse index, wherein the highest average job priority sparse indexes are the most popular indexes, and the lowest average job priority sparse indexes are the least popular indexes.

6. The computer-implemented method of claim 1, wherein the plurality of sparse indexes reference the same column within the database table.

7. The computer-implemented method of claim 1, wherein in the plurality of sparse indexes reference a plurality of columns within the database table.

8. The computer-implemented method of claim 1, wherein one or more of the plurality of sparse indexes are ignored in computing the value of the bitmap, based upon a set of predefined criteria.

9. The computer-implemented method of claim 8, wherein one of the set of predefined criteria is the number of rows selected by the sparse index.

10. The computer-implemented method of claim 1, wherein the sparse index is a structured query language (SQL) index.

11. The computer-implemented method of claim 1, wherein the sparse index is a select/omit logical file.

12. The computer-implemented method of claim 1, wherein sorting the row entries within the database table based upon the value of the bitmap further comprises the steps of:
   determining a degree of adjacency metric for rows in the database table referenced by each of the plurality of sparse indexes; and
   if the value of the degree of adjacency metric exceeds a predefined threshold value, sorting the row entries within the database.

13. A program product, comprising:
   a computer readable storage medium; and
   program code stored on the computer readable storage medium and configured upon execution to reorganize a database table residing on a computer system according to a plurality of sparse indexes, comprising the steps of:
      constructing a bitmap for each row entry within the database table, the bitmap having n bit positions, each of the n bit positions corresponding to the referencing state of one of the plurality of sparse indexes;
      computing a value for the bitmap as a function of individual bit values for the n bit positions; and
      sorting the row entries within the database table based upon the value of the bitmap.

14. The program product of claim 13, further executing the steps of:
   initializing the bitmap to "0";
   for each row within the database table, determining if any of the plurality of sparse indexes point to the row; and
   if yes, setting the bit positions within the bitmap corresponding to the referencing sparse indexes associated with the row to "1".

15. The program product of claim 14, wherein the bit positions within the bitmap are organized such that the most significant bit positions within the bitmap are assigned to the most popular indexes within the plurality of sparse indexes, and the least significant bit positions within the bitmap are assigned to the least popular indexes.

16. The program product of claim 15, wherein the popularity of each of the sparse indexes is determined by monitoring query use of the sparse index by at least one counter.

17. The program product of claim 15, wherein the popularity of each of the sparse indexes is determined by computing and saving the average job priority of queries associated with the sparse index, wherein the highest average job priority sparse indexes are the most popular indexes, and the lowest average job priority sparse indexes are the least popular indexes.

18. The program product of claim 13, wherein the plurality of sparse indexes reference the same column within the database table.

19. The program product of claim 13, wherein in the plurality of sparse indexes reference a plurality of columns within the database table.

20. The program product of claim 13, wherein one or more of the plurality of sparse indexes are ignored in computing the value of the bitmap, based upon a set of predefined criteria.

21. The program product of claim 20, wherein one of the set of predefined criteria is the number of rows selected by the sparse index.

22. A system, comprising:
   one or more computer processors; and
   a memory containing a program, which when executed by the one or more computer processors is configured to perform an operation comprising:
      constructing a bitmap for each row entry within the database table, the bitmap having n bit positions, each of the n bit positions corresponding to a referencing state of one of the plurality of sparse indexes;
      computing a value for the bitmap as a function of individual bit values for the n bit positions; and
      sorting the row entries within the database table based upon the value of the bitmap.

23. The system of claim 22, further including:
   initializing the bitmap to "0";
   for each row within the database table, determining if any of the plurality of sparse indexes point to the row; and
   if yes, setting the bit positions within the bitmap corresponding to the referencing sparse indexes associated with the row to "1".

24. The system of claim 22, wherein the bit positions within the bitmap are organized such that the most significant bit positions within the bitmap are assigned to the most popular indexes within the plurality of sparse indexes, and the least significant bit positions within the bitmap are assigned to the least popular indexes.

25. The system of claim 24, wherein the popularity of each of the sparse indexes is determined by monitoring query use of the sparse index by at least one counter.

26. The system of claim 24, wherein the popularity of each of the sparse indexes is determined by computing and saving the average job priority of queries associated with the sparse index, wherein the highest average job priority sparse indexes are the most popular indexes, and the lowest average job priority sparse indexes are the least popular indexes.

27. The system of claim 22, wherein the plurality of sparse indexes reference the same column within the database table.

28. The system of claim 22, wherein in the plurality of sparse indexes reference a plurality of columns within the database table.

29. The system of claim 22, wherein one or more of the plurality of sparse indexes are ignored in computing the value of the bitmap, based upon a set of predefined criteria.

30. The system of claim 29, wherein one of the set of predefined criteria is the number of rows selected by the sparse index.

* * * * *